Figure 1:
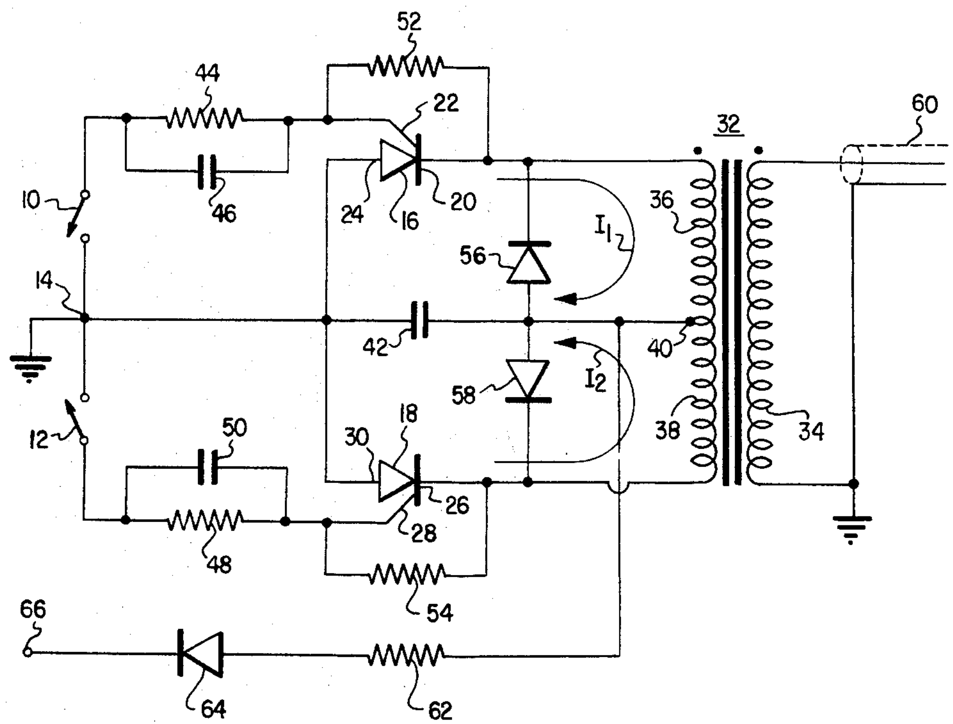

DATA TRANSMITTING CIRCUIT

Filed Jan. 4, 1966 2 Sheets-Sheet 1

INVENTORS.
CHARLES R. BRUCE
IRVIN D. JOHNSON

BY Sughrue, Rothwell, Mion, Zinn & Macpeak
ATTORNEYS.

INVENTORS.
CHARLES R. BRUCE
IRVIN D. JOHNSON

BY Sughrue, Rothwell, Mion, Zinn & Macpeak
ATTORNEYS.

United States Patent Office 3,394,364

Patented July 23, 1968

3,394,364
DATA TRANSMITTING CIRCUIT

Charles R. Bruce and Irvin D. Johnson, Littleton, Colo., assignors to Marathon Oil Company, Findlay, Ohio, a corporation of Ohio Filed Jan. 4, 1966, Ser. No. 518,632
10 Claims. (Cl. 340—206)

The information relates to data transmitting circuits for transmitting information in electrical form to a remote station, and more particularly to telemetering circuits in which the condition to be measured causes firing of controlled rectifiers which in turn provide pulses to be transmitted to the remote station.

In telemetering systems, such as those which supply information at the surface of conditions in a borehole, it is known to use switches whose time of switching is dependent upon the magnitude of a condition being monitored. In general, these systems comprise a fixed reference contact, a condition responsive device having a rotatable shaft carrying an indicator contact, and a rotatable sweep contact. A change in the condition being measured causes the device to effect a proportional angular displacement between the indicator and reference contacts. This displacement is cyclically converted into an interval comprising a measure of the condition by the sweep contact which successively contacts the indicator and reference contact once each revolution to produce two electric pulses or signals which define the interval and which are transmitted by cable to recording apparatus at the surface of the ground.

As a particular example, the contact closures may be from a bourdon tube pressure gauge in which a motor turns a contactor that first contacts a stationary contact and then a contact on the free end of the bourdon tube. The amount of rotation between contacts is proportional to pressure, and the closings of the contacts produce electrical signals which are transmitted to a remote station (surface station in the case of borehole pressure measurement) where the pressure is monitored.

The present invention is a system which responds to such contact closure by firing controlled rectifiers which in turn produce positive and negative pulses for transmission to the remote station. The time displacement between the positive and negative pulse is a measure of the condition being monitored. Some of the advantages of the present circuit over the known prior art are: negligible current passes through the contacts thereby resulting in a longer contact life; very uniform pulses are produced; the system is very small in size.

It is therefore an object of the present invention to provide a new and improved system for converting condition responsive contact closure into positive and negative pulses which are transmitted to a remote station.

A further object of the present invention is to provide a new and improved controlled rectifier circuit for forming time displaced pulses proportional to contact closure displacement and for transmitting the pulses to a remote station.

The above objects and advantages are carried out by a preferred embodiment of the invention which comprises a pair of silicon-controlled rectifiers, adapted to be fired by closing first and second condition responsive contacts respectively, a capacitor and means for storing a charge on the capacitor, circuit connections for discharging said capacitor through one of the fired silicon-controlled rectifiers and through the primary of a transformer in a first direction, and circuit connection for discharging the capacitor through the second silicon-controlled rectifier and the primary of a transformer in the opposite direction, and a transmission line fed by the transformer's secondary for transmitting the output pulses to a remote station.

Figure 2:
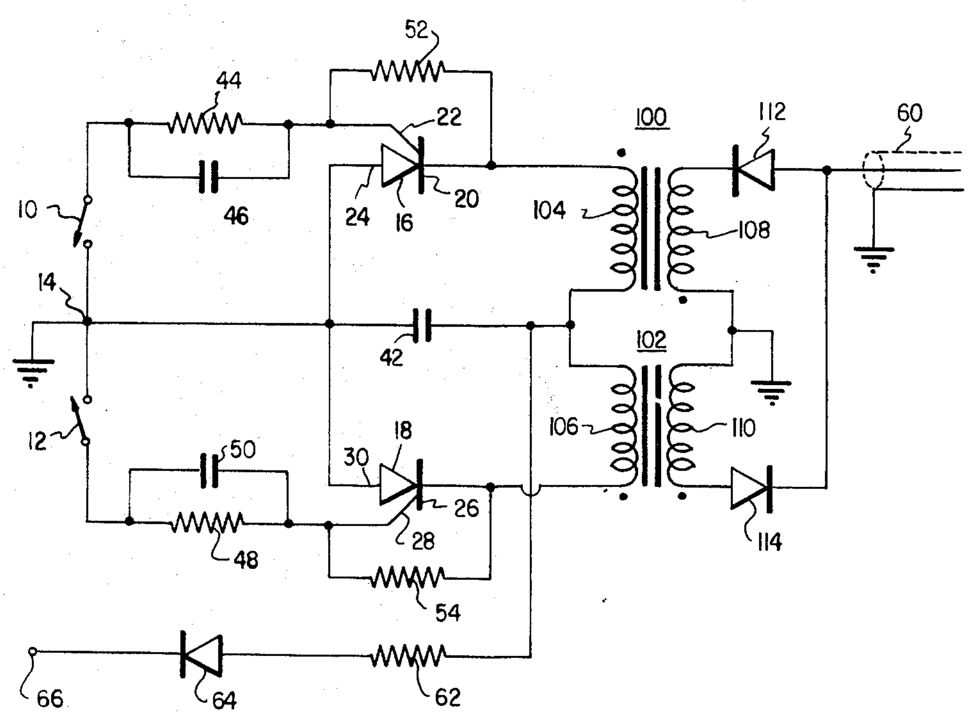

The foregoing and other objects, features and advantages of the invention will be apparent from the following more particular description of a preferred embodiment of the invention, as illustrated in the accompanying drawings, wherein FIGURE 1 is a schematic diagram of a preferred embodiment of the invention, and FIGURE 2 is a schematic diagram of the invention showing changes in the output circuitry.

The circuit shown in FIGURE 1 is adapted to convert the condition controlled contact closure of switches 10 and 12 into positive and negative pulses which are transmitted to a surface station or remote station via transmission line 60. A particular means for causing switches 10 and 12 to close in response to a particular condition being measured, such as pressure in a borehole, is not illustrated because such systems are well known in the art. For the purpose of understanding the present invention, it is sufficient to note that the condition being measured causes switch 10 to close and open followed by switch 12 closing and opening, wherein the time between the contact closure of switches 10 and 12 is proportional to that condition.

The purpose of switches 10 and 12 is to provide positive pulses to the gate terminals of SCR's 16 and 18. However it will be apparent to those having ordinary skill in the art that turn-on pulses may be applied to the SCR gate terminals by actuating means other than mechanical switches. In all cases the actuating means respond to the condition being monitored such that the time displacement between gate turn-on pulses is dependent upon the value of the condition.

Switch 10 is connected at one terminal to a ground or common voltage reference point 14 and at the other terminal to the gate 22 of silicon-controlled rectifier 16 via a parallel RC network comprising resistor 44 and capacitor 46. Switch 12 is also connected at one terminal to the ground point 14. The other terminal of switch 12 is connected to the gate 28 of silicon-controlled rectifier 18 via a parallel RC network comprising resistor 48 and capacitance 50. A capacitor 42 is connected in series with the anode 24-cathode 20 path of silicon-controlled rectifier 16 and the upper half 36 of the primary winding of transformer 32. The capacitor 42 is also connected in series with the anode 30-cathode 26 path of silicon-controlled rectifier 18 and the lower half 38 of the primary winding of transformer 32. The secondary winding 34 of transformer 32 is connected to the input of a transmission line 60 which sends electrical impulses to a remote station. Resistors 52 and 54 are connected across the gate-cathode terminals of silicon-controlled rectifiers 16 and 18, respectively, and diodes 56 and 58 are connected in parallel with upper half 36 and lower half 38, respectively, of the primary winding. The voltage bias for the circuit is applied to the junction of capacitor 42 and center tap 40 of transformer 32 by the series connection of a resistor 62 and a rectifying diode 64 which are connected to an AC terminal 66. AC terminal 66 is connected to a source of AC voltage when the circuit is in operation. A DC source, not shown, may be used instead of the AC input and the rectifier.

The circuit operation is as follows. When switches 10 and 12 are open and terminal 66 is connected to a source of AC power supply, a negative voltage is applied to terminal 40 causing capacitor 42 to be charged negatively on the side opposite the reference terminal 14. Since there is no conduction through resistors 52 and 54, the gate-to-cathode voltages of silicon-controlled rectifiers 16 and 18 are zero, thereby maintaining the silicon-controlled rectifiers in their off state.

When switch 10 is closed, the voltage on gate 22 of silicon-controlled rectifier 16 is raised through capacitor 46 to the ground level causing silicon-controlled rectifier 16 to fire. When fired, silicon-controlled rectifier 16 provides a discharge path for the charge on capacitor 42 causing a current in the direction indicated by $I_1$. The current passes through the primary of transformer 36 in a direction as indicated causing a positive output pulse to appear across secondary 34 of transformer 32.

When switch 12 closes a similar situation occurs causing silicon-controlled rectifier 18 to fire. Capacitor 42 is then discharged through silicon-controlled rectifier 18 and the lower half 38 of the primary winding resulting in a current having a direction indicated by $I_2$. The latter current flowing through the lower half 38 of the primary winding results in a negative pulse appearing across secondary 34 of transformer 32. The positive and negative pulses are transmitted to a remote station via transmission line 60 where the time difference between the two pulses is measured, indicating the magnitude of the condition being monitored. Diodes 56 and 58 provide current paths for the current remaining in the primary windings when the respective silicon-controlled rectifier is turned off.

The circuit is also capable of providing telemetering information relating to more than a single variable. For example, if a first variable controls the closure frequency of switch 10 and a second variable controls the closure frequency of switch 12, the time displacement of negative pulses on transmission line 60 is equivalent to the first variable, and the time displacement of positive pulses on transmission line 60 is equivalent to the second variable.

The circuit shown in FIGURE 2 differs from the circuit of FIGURE 1 only in the output portion. Instead of using a single transformer, the circuit includes two transformers 100 and 102. Also, diodes 112 and 114, which prevent overshoot, are in the secondary rather than the primary.

The changes provide a better signal-to-noise ratio at the receiving end of the cable and equal amplitidues for both positive and negative pulses. The circuit in FIGURE 1 produces positive pulse amplitudes which are between one-half and two-thirds of the negative pulse amplitude, and on a 10,000 foot cable, the signal-to-noise ratio for positive pulses is 2. The circuit of FIGURE 2 produces pulses of equal amplitude and the signal-to-noise ratio is 5 or better.

One example of the parameters which may be used in practicing the invention are listed below.

| | |
|---|---|
| Diodes **56** and **58** | IN645. |
| Diodes **64**, **112**, **114** | IN647. |
| SCR's **16**, **18** | 2N1597. |
| Capacitor **42** | 2 microfarads. |
| Capacitors **46**, **50** | 0.002 microfarad. |
| Resistors **44**, **48** | 470K. |
| Resistors **52**, **54** | 1K. |
| Resistors **62** | 10K. |
| AC voltage supply | 120 v. A.C. |
| Transformer **32**, **100**, **102** | United Transformer Company Type SSO–19. |

While the invention has been particularly shown and described with reference to a preferred embodiment thereof, it will be understood by those skilled in the art that various changes in form and details may be made therein without departing from the spirit and scope of the invention.

What is claimed is:

1. In a telemetering system of the type having a pair of actuating means at a first location, said actuating means being actuated in response to a condition being measured at said first location, such that the time between actuation is proportional to the condition being measured, and a transmission line for transmitting to a remote location electrical signals indicative of said condition, the improvement comprising, (a) a transformer means having a primary and a secondary for coupling signals to the transmission line, said secondary being connected to the input of said transmission line, the primary of said transformer means having a central terminal dividing the primary into upper and lower portions; (b) first and second silicon-controlled rectifiers, each having anode, cathode and gate terminals; (c) a capacitor connected to form a series circuit with the upper portion of said primary and the anode-cathode path of said first silicon-controlled rectifier, said capacitor also forming a series circuit with the lower portion of said primary and the anode-cathode path of said second silicon-controlled rectifier; (d) means for applying a voltage across said capacitor; (e) the first of said actuating means being connected between one terminal of said capacitor and the gate terminal of said first silicon-controlled rectifier, whereby said first silicon-controlled rectifier is fired, discharging the charge on said capacitor through the upper portion of the primary when said first actuating means is actuated; (f) the second of said actuating means being connected between said one terminal of said capacitor and the gate terminal of said second silicon-controlled rectifier, whereby said second silicon-controlled rectifier is fired, discharging the charge on said capacitor through the lower portion of the primary when said second actuating means is actuated.

2. A telemetering system as claimed in claim 1 wherein said actuating means is a normally open switch which is closed when actuated.

3. The system as claimed in claim 1 wherein the means for applying a voltage across said capacitor comprises a first terminal for connection to an AC power supply and a rectifier connected between said first terminal and the other terminal of said capacitor.

4. The system as claimed in claim 1 further comprising (a) a first diode in parallel with the upper portion of said primary winding, and (b) a second diode in parallel with the lower portion of said primary winding.

5. The system as claimed in claim 4 further comprising, (a) a first parallel R–C network in between said first actuating means and the gate of said silicon-controlled rectifier, (b) a second parallel R–C network in between said second actuating means and the gate of said second silicon-controlled rectifier, and (c) a pair of resistors connected between the gate and cathode terminals of said first and second silicon-controlled rectifiers respectively.

6. A telemetering system as claimed in claim 5 wherein said actuating means is a normally open switch which is closed when actuated.

7. A telemetering system as claimed in claim 6 wherein the means for applying a voltage across said capacitor comprises a first terminal for connection to an AC power supply and a rectifier connected between said first terminal and the other terminal of said capacitor.

8. The system as claimed in claim 5 wherein said transformer means comprises first and second individual transformers each having primary and secondary windings, said upper portion being the primary winding of said first transformer and said lower portion being the primary winding of said second transformer, the primary windings of said first and second transformers being connected in series.

9. the system as claimed in claim 8 wherein the secondary winding of said first transformer is connected to the input of said transmission line, and a first diode connected between said secondary winding of said first transformer and the input to said transmission line for passing signals of a first polarity, the secondary winding of said second transformer being connected to the input of said transmission line, and a second diode connected between said secondary winding of said second transformer and the input to said transmission line for passing signals of a second polarity.

10. A telemetering system as claimed in claim 9 wherein said actuating means is a normally open switch which is closed when actuated.

No references cited.

THOMAS B. HABECKER, *Primary Examiner*